Feb. 15, 1949.　　　　J. E. HILLS　　　　2,461,981
PACKAGING
Filed Feb. 5, 1948
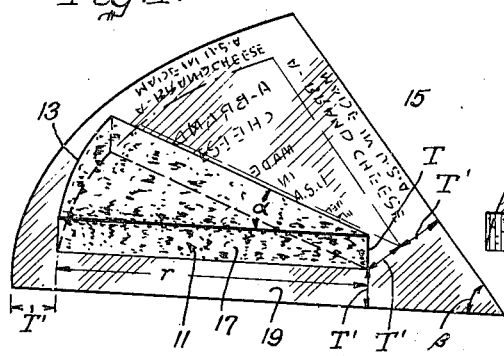
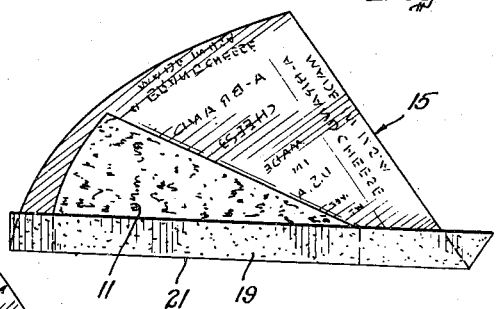
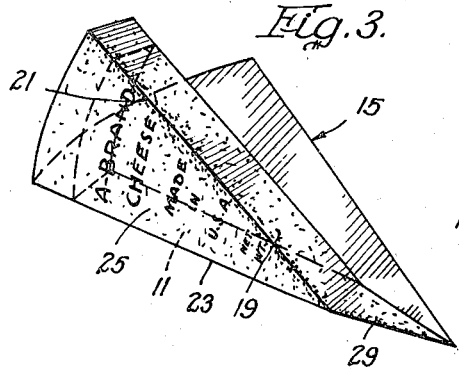
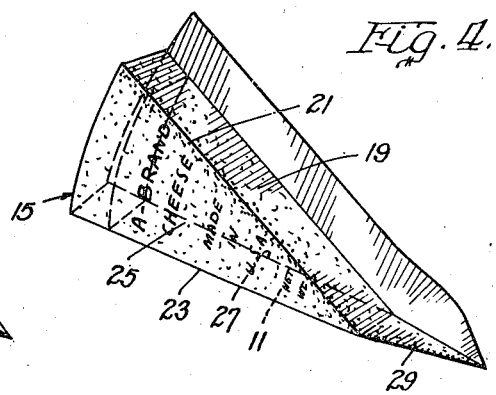
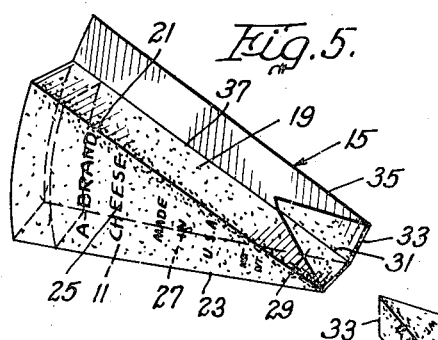
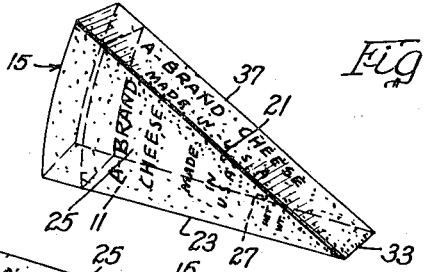
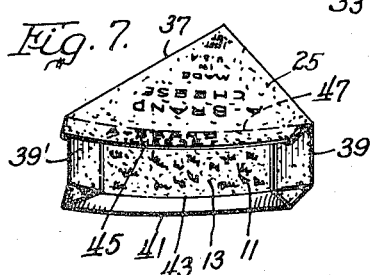
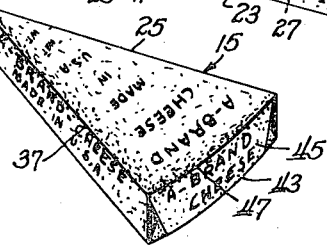
Inventor:
Joseph E. Hills.
By Soans, Pond, & Anderson
Attys Patented Feb. 15, 1949

2,461,981

UNITED STATES PATENT OFFICE 2,461,981

PACKAGING

Joseph E. Hills, Chicago, Ill., assignor to Kraft Foods Company, Chicago, Ill., a corporation of Delaware Application February 5, 1948, Serial No. 6,534

6 Claims. (Cl. 99—178)

The present invention relates to packaging and, more particularly, to a wrapper for, and a method of wrapping, individual cheese servings which are in the shape of sectors of right, circular, cylinders.

Several types of cheese such as Roquefort and Camembert, are traditionally marketed in generally wedge-shaped servings or portions. In the case of Roquefort, the cured wheel of cheese is first sliced into cylindrical disks of suitable thickness, and then the disks are cut into right sectors and are wrapped for market. Camembert cheese is usually formed into wedge-shaped sectors prior to being cured and is subsequently cured in that shape.

Heretofore extreme difficulty has been encountered in the packaging of such wedge-shaped servings of cured cheese. The irregular shape of the cheese serving makes the use of conventional square wrapping sheets uneconomical because much material is wasted and it is necessary to fold a square sheet an excessive number of times in order to smoothly enclose the cheese. The large number of folds make it extremely difficult to obtain a neat package and the large amount of time expended in making them greatly increases the cost of wrapping. A further difficulty with the present wrapper occurs when a cut portion of cheese wheys off. In such event the liquid may leak through the wrapper causing damage to the appearance of the wrapper and to the other cheese portions which are in contact with, or are adjacent to, the portion from which the moisture is exuded.

Another difficulty with the present wrappers stems from the fact that the multiplicity of folds necessary to completely enclose a cheese portion makes it difficult to provide advertising copy and brand labeling which will be properly positioned on all of the plane sides of the cheese portion. It is possible with the known wrappers to center the label or advertising copy on the upper face of the serving of cheese, but it is extremely difficult to maintain labeling in a readable condition on the radially extending sides or on the bottom of the serving. Moreover, when cheese is served in individual portions wrapped with a conventional, square wrapper, it is necessary to turn it over to open the wrapper, thus exposing the unprinted sides and the bottom of the cheese.

The principal object of the present invention is to provide a wrapper for a sector-shaped portion of cheese which will tend to retard leaking, which may easily be unwrapped and rewrapped, and which is neat in appearance, thereby adding to the sales appeal of the wrapped cheese product. Another object of the invention is the provision of a wrapping sheet which will present the appearance of a seamless wrapper and which may carry an accurately positioned label or advertising copy on all of the plane surfaces of the wrapped serving. Further and more specific objects of the invention are to provide an inexpensive wrapper which can be applied manually, and to provide a method of wrapping which requires a minimum amount of time and a minimum amount of skill on the part of the person who is wrapping the cheese.

Other objects and advantages of the invention will become known by reference to the following description and the accompanying drawings wherein the improved wrapper and the steps in folding the same about a serving of cheese are illustrated.

In the drawings:

Fig. 1 is a perspective view showing an improved wrapper in accordance with the invention, and a sector-shaped serving of cheese. The dimension T' is equal to the thickness, T, of the serving of cheese and illustrates the positioning of the serving upon the wrapping sheet; and Figs 2-8 are perspective views illustrating successive steps in the formation of the package, Fig. 8 being a a perspective view of the completed package.

The cheese portion or serving 11, illustrated in the drawings, is of the characteristic Roquefort cheese shape and comprises a sector of a right circular cylinder. The serving has a top surface, a bottom surface which is parallel to the top surface, two, plane, radially extending, side surfaces which diverge from an apex, and a fifth side which is curved, the radius being substantially equal to the length of the radially extending, diverging, side surfaces; the curved fifth side intersects each of the other four sides at substantially a right angle. The angle $\alpha$ at the apex of the serving is usually in the neighborhood of from about 15 to 30 degrees, and the thickness, T, of the serving is about one-fourth to one-half of the length of the arc 13 bounding the outer surface of the sector. Although the following description is directed particularly to small, individual-sized servings, it will be apparent that a similar wrapper and wrapping method may be employed for packaging larger cuts of cheese having a similar shape. It will also be understood that ordinary cheese cutting procedures sometimes produce sections which are not exactly true geometric shapes.

A wrapper 15 in accordance with the invention comprises a sector-shaped piece of wrapping material whose vertex angle β (Fig. 1), is twice the angle α at the apex of the sector-shaped serving of cheese 11, the radius R of the wrapping sheet 15 is such that when the cheese portion is placed within the wrapper the portion is covered on the top, the bottom, and on one of the radially extending sides by a single layer of wrapping material and on the remaining radially extending side 17 of the serving (Fig. 1) by a double layer of wrapping material. It can be shown that the proper dimensions for the wrapping sheet may be defined to a high degree of accuracy by the formula:

$$R = T\left(1 + \frac{\frac{1}{2} + \cos \alpha}{\sin \alpha}\right) + r$$

where:

R is the radius of the wrapping sheet,
T is the thickness of the sector-shaped cheese serving.
r is the length of one of the radially extending sides of the cheese serving, and
α is the angle at the apex of the sector-shaped cheese serving.

In certain instances it may be possible to employ a wrapping sheet which has a series of short, straight lines around its outer edge in place of the curved edge which has been described above. This wrapping sheet will be approximately in the shape of a sector but will be less expensive to cut.

The wrapper 15 is first cut to size by a conventional die cutting machine or the like in accordance with the preceding formula. Either before or after cutting, one surface of the wrapper is printed with advertising matter copy and brand labeling. In this connection, an unprinted area 19 which is equal to the thickness of the block is desirably provided along one of the radial edges of the wrapping sheet sector. This unprinted strip is illustrated at 19 in Fig. 1. The printing faintly shows through the wrapper, as illustrated in Fig. 1, even though the material printed upon is not transparent, as for example aluminum foil etc., and the faint outline of the printed matter can be used, in the wrapping method of the invention, to index the portion of cheese 11 upon the wrapping sheet sector 15 during the wrapping operation.

When wrapping cheese in accordance with the invention, the sector-shaped serving of cheese, 11, is placed upon the printed matter which is adjacent to the unprinted area 19 of the wrapping sheet sector 15 as illustrated in Fig. 1. The radial side 17 of the serving of cheese 11 is then spaced from the edge of the wrapping sector a distance equal to the thickness of the serving and the curved edge 13 of the serving is also spaced from the arc of the wrapping sector a distance equal to about the thickness of the serving. The unprinted strip of wrapping material 19 is then folded upwardly along line 21 to the position shown in Fig. 2. The folded, unprinted strip 19, protects the radial side 17 of the serving of cheese 11.

The cheese serving is then turned upon its uncovered radial edge making a fold along line 23 (Fig. 3). In the drawing (Fig. 3) the printed matter which will appear on the bottom of the cheese portion is illustrated at 25. The remainder of the wrapping sheet is then folded upwardly along line 27 to the position illustrated in Fig. 4. The tab 29, extending outwardly from the apex of the cheese portion, is then folded inwardly across the apex or wedge end of the cheese portion, as illustrated at 31 in Fig. 5. Care should be taken in making this fold to insure that the upwardly extending fold 33, which results, is at right angles to the edge 35 of the wrapping sheet 15.

After the tab 29 has been folded inwardly along the radial side of the cheese wedge, the remaining free wrapping material is folded downwardly, over the cheese portion, along line 37 (Figs. 5 and 6), to complete the closure of the top, the bottom, and the two radial sides. As can be seen in Fig. 6, the apex of the serving presents a neat appearance, and it is difficult to notice the seam which runs along the fold line 21.

The sector-shaped cheese serving, which is enclosed on the top, the bottom, and the two radial sides by the wrapping sector, is turned on its bottom surface to the position illustrated in Fig. 7. The wrapping material, which extends past the curved edge 13, is then folded inwardly against the cheese. The material at the sides of the servings are folded inwardly along lines 39 and 39', as illustrated in Fig. 7. The bottom tab 41 which results from the preceding operation is folded upwardly along line 43 and the upper tab 45 is folded downwardly along line 47 (Figs. 7 and 8). The final package presents the appearance shown in Fig. 8.

The wrapped, sector-shaped, cheese portion has only one outside tab, the tab 45 which extends downwardly across the curved surface 13 of the serving. The tab 45 is of a large size and may be printed with appropriate advertising copy or brand labeling so that the seam is not noticeable. The construction of the package gives the cheese serving the appearance of being enclosed in a seamless envelope, the only breaks in the envelope being the seam along the edge 21 and the tab at the curved edge of the sector.

The wrapping material from which the wrapping sector is cut may be any one of the conventional wrapping materials. Paper, cellophane, wax coated cellophane, rubber hydrochloride, waxed paper, and metal foils such as aluminum foil have all been used with success. The materials which are transparent may be dyed with an appropriate color to enhance the appearance of the product. The wrapping method of the invention, however, is possibly of greatest value in foil wrapping because the foil is not marred when it is applied to the cheese.

Various modifications of the wrapping method may present themselves to one skilled in the art, as for example, the sector-shaped cheese serving may be indexed upon the wrapper, in the first step of the wrapping method, by placing it upon one of its radial edges along the center line of the wrapping sector and then folding the free wrapping material around each side of the serving.

Various of the features of the invention, believed to be new, are set forth in the appended claims.

I claim:

1. In combination with a serving of cheese which is in the shape of a sector of a right circular cylinder, and which has a plane top surface, a plane bottom surface which is parallel to said top surface, two plane radially extending side surfaces which diverge from an apex, and a curved surface intersecting said top, said bottom, and said side surfaces to form a curved fifth side, a wrapper which is formed from a substantially sector-shaped flat sheet of wrapping material, said sheet being wrapped about said cheese in a manner such that the top, the bottom, and one of the radially extending sides of said serving are covered by a single layer of said wrapping material, and the other radially extending side surface of said serving is covered by overlapping layers of said wrapping material, said wrapper having only one outside tab located on the curved surface of said serving.

2. In combination with a serving of cheese which is in the shape of a sector of a right circular cylinder, and which has a plane top surface, a plane bottom surface which is parallel to said top surface, two plane radially extending side surfaces which diverge from an apex, and a curved surface intersecting said top, said bottom, and said side surfaces to form a curved fifth side, a wrapper which is formed from a generally sector-shaped flat sheet of wrapping material, the sector having a radius which is greater than the length of said radially extending side surfaces of said cheese serving, said sheet being wrapped about said cheese in a manner such that the top, the bottom, and one of the radially extending sides of said serving are covered by a single layer of said wrapping material, and the other radially extending side surface of said serving is covered by an overlapping layer of said wrapping material, the vertex of said sector-shaped piece of wrapping material being folded inwardly between said overlapping layers of wrapping material.

3. In combination with a serving of cheese which is in the shape of a sector of a right circular cylinder, and which has a plane top surface, a plane bottom surface which is parallel to said top surface, two plane radially extending side surfaces which diverge from an apex, and a curved surface intersecting said top, said bottom, and said side surfaces to form a curved fifth side, a wrapper which is formed from a sector-shaped, flat sheet of wrapping material, said sheet having an angle at its vertex which is twice the angle between the radially extending, diverging, side surfaces of said cheese serving, and a radius which is expressed by the formula:

$$R = T\left(1 + \frac{\frac{1}{2} + \cos \alpha}{\sin \alpha}\right) + r$$

wherein, R is the radius of the wrapping sheet, T is the thickness of the serving of cheese, $r$ is the length of one of the radially extending surfaces of said cheese serving, and $\alpha$ is the angle at the apex of the cheese serving, said sheet being wrapped about said cheese in a manner such that the top, the bottom, and one of the radially extending side surfaces of said serving are covered by a single, seamless layer of said wrapping sheet, and the other radially extending surface of said block is substantially completely covered by a double layer of said wrapping sheet.

4. In combination with a serving of cheese which is in the shape of a sector of a right circular cylinder, and which has a plane top surface, a plane bottom surface which is parallel to said top surface, two plane radially extending side surfaces which diverge from an apex, and a curved surface intersecting said top, said bottom, and said side surfaces to form a curved fifth side, a wrapper which is formed from a sector-shaped, flat sheet of wrapping material, said sheet having an angle at its vertex which is twice the angle between the radially extending, diverging, side surfaces of said cheese serving, and a radius which is expressed by the formula:

$$R = T\left(1 + \frac{\frac{1}{2} + \cos \alpha}{\sin \alpha}\right) + r$$

wherein, R is the radius of the wrapping sheet, T is the thickness of the serving of cheese, $r$ is the length of one of the radially extending surfaces of said cheese serving, and $\alpha$ is the angle at the apex of the cheese serving, said sheet being wrapped about said cheese in a manner such that the top, the bottom, and one of the radially extending side surfaces of said serving are covered by a single, seamless layer of said wrapping sheet, and the other radially extending surface of said block is covered by overlapping layers of said wrapping sheet, and the material at the vertex of said wrapping sector is folded inwardly between said overlapping layers.

5. In combination with a serving of cheese which is in the shape of a sector of a right circular cylinder, and which has a plane top surface, a plane bottom surface which is parallel to said top surface, two plane radially extending side surfaces which diverge from an apex, and a curved surface intersecting said top, said bottom, and said side surfaces to form a curved fifth side, a wrapper which is formed from a sector-shaped, flat sheet of wrapping material, said sheet having an angle at its vertex which is twice the angle between the radially extending, diverging, side surfaces of said cheese serving, and a radius which is expressed by the formula:

$$R = T\left(1 + \frac{\frac{1}{2} + \cos \alpha}{\sin \alpha}\right) + r$$

wherein, R is the radius of the wrapping sheet, T is the thickness of the serving of cheese, $r$ is the length of one of the radially extending surfaces of said cheese serving, and $\alpha$ is the angle at the apex of the cheese serving, said sheet being wrapped about said cheese in a manner such that the top, the bottom, and one of the radially extending side surfaces of said serving are covered by a single, seamless layer of said wrapping sheet, and the other radially extending surface of said block is covered by overlapping layers of said wrapping sheet, the material at the vertex of said wrapping sector is folded inwardly between said overlapping layers, and the wrapped material which extends past the curved side of said cheese serving is folded against said curved surface to form a single outside tab.

6. The method of wrapping the serving of cheese which is in the shape of a sector of a right circular cylinder, and which has a plane top surface, a plane bottom surface which is parallel to said top surface, two plane radially extending side surfaces which diverge from an apex, and a curved surface intersecting said top, said bottom, and said side surfaces to form a curved fifth side, with a generally sector-shaped sheet of flat wrapping material which comprises placing the serving of cheese on the wrapping material in a position such that one of the radially extending surfaces of said cheese serving is spaced from the edge of said wrapper a distance equal to the distance between said top and said bottom surfaces, folding the wrapper over the radially extending surface, folding the wrapping material around the second radially extending surface and the upper surface of said cheese serving, folding the wrapping material in the vertex of the wrapping sector which extends outwardly from the apex of said serving, inwardly across said apex onto said radially extending surface, folding the remainder of said wrapper downwardly across said radially extending surface to cover said vertex, folding the wrapping material at the outer end of said radially extending surface inwardly across said curved surface, and finally folding the wrapping material extending outwardly from the top and the bottom surface of the serving across the curved surface of said serving to complete the closure.

JOSEPH E. HILLS.

REFERENCES CITED

The following references are of record in the file of this patent:

UNITED STATES PATENTS

| Number | Name | Date |
|---|---|---|
| 781,192 | Dingwall | Jan. 31, 1905 |
| 1,054,433 | Masse | Feb. 25, 1913 |
| 1,158,046 | Haines | Oct. 26, 1915 |
| 2,039,830 | Owens | May 5, 1936 |

FOREIGN PATENTS

| Number | Country | Date |
|---|---|---|
| 300,202 | Great Britain | Mar. 28, 1929 |